United States Patent
Kim et al.

(10) Patent No.: US 11,381,504 B2
(45) Date of Patent: *Jul. 5, 2022

(54) IDENTIFYING CONGESTION IN A NETWORK

(71) Applicant: Barefoot Networks, Inc., Santa Clara, CA (US)

(72) Inventors: Changhoon Kim, Palo Alto, CA (US); Jeongkeun Lee, Mountain View, CA (US); Xiaozhou Li, San Jose, CA (US); Masoud Moshref Javadi, Sunnyvale, CA (US); Georgios Nikolaidis, Mountain View, CA (US); Ethan M. Spiegel, Mountain View, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 16/810,727

(22) Filed: Mar. 5, 2020

(65) Prior Publication Data

US 2020/0274806 A1    Aug. 27, 2020

Related U.S. Application Data

(63) Continuation of application No. 15/895,908, filed on Feb. 13, 2018, now Pat. No. 10,608,939.

(51) Int. Cl.
*H04J 3/16* (2006.01)
*H04L 12/28* (2006.01)
(Continued)

(52) U.S. Cl.
CPC ............ *H04L 47/11* (2013.01); *H04L 43/062* (2013.01); *H04L 47/33* (2013.01); *H04L 47/50* (2013.01); *H04L 49/1546* (2013.01)

(58) Field of Classification Search
None
See application file for complete search history.

(56) References Cited

U.S. PATENT DOCUMENTS

| 7,391,786 | B1 * | 6/2008 | Prasad .................. H04L 49/101 370/429 |
| 8,976,791 | B1 | 3/2015 | Sivan et al. |

(Continued)

OTHER PUBLICATIONS

Kim, Changhoon et al., "In-band Network Telemetry (INT)", Barefoot Networks, Jun. 2016, 28 pages.

(Continued)

*Primary Examiner* — Sithu Ko
(74) *Attorney, Agent, or Firm* — Essential Patents Group, LLP.; Christopher K. Gagne

(57) ABSTRACT

Some embodiments of the invention provide a method for reporting congestion in a network that includes several forwarding elements. In a data plane circuit of one of the forwarding elements, the method detects that a queue in the switching circuit of the data plane circuit is congested, while a particular data message is stored in the queue as it is being processed through the data plane circuit. In the data plane circuit, the method then generates a report regarding the detected queue congestion, and sends this report to a data collector external to the forwarding element. To send the report, the data plane circuit in some embodiments duplicates the particular data message, stores it in the duplicate data message information regarding the detected queue congestion, and sends the duplicate data message to the external data collector.

20 Claims, 5 Drawing Sheets

(51) Int. Cl.
  *H04L 47/11* (2022.01)
  *H04L 47/33* (2022.01)
  *H04L 49/1546* (2022.01)
  *H04L 43/062* (2022.01)
  *H04L 47/50* (2022.01)

(56) References Cited

U.S. PATENT DOCUMENTS

| | | | |
|---|---|---|---|
| 9,537,793 B2 | 1/2017 | Kapadia et al. | |
| 9,755,932 B1* | 9/2017 | Godbole | H04L 43/0876 |
| 10,135,734 B1 | 11/2018 | Singh et al. | |
| 10,230,810 B1 | 3/2019 | Bhide et al. | |
| 10,608,939 B1 | 3/2020 | Kim et al. | |
| 2004/0022239 A1 | 2/2004 | Bosshart | |
| 2004/0208163 A1 | 10/2004 | Patel et al. | |
| 2005/0147042 A1 | 7/2005 | Purnadi et al. | |
| 2005/0276230 A1 | 12/2005 | Akahane et al. | |
| 2007/0183415 A1 | 8/2007 | Fischer et al. | |
| 2007/0195773 A1 | 8/2007 | Tatar et al. | |
| 2007/0195777 A1* | 8/2007 | Tatar | H04L 49/1546 370/469 |
| 2008/0168304 A1 | 7/2008 | Flynn et al. | |
| 2008/0247409 A1 | 10/2008 | Choudhury et al. | |
| 2008/0256183 A1 | 10/2008 | Flynn et al. | |
| 2009/0109973 A1 | 4/2009 | Ilnicki | |
| 2009/0180380 A1* | 7/2009 | Prabhakar | H04L 47/10 370/232 |
| 2010/0088756 A1 | 4/2010 | Balakrishnan et al. | |
| 2010/0232443 A1 | 9/2010 | Pandey | |
| 2011/0164509 A1 | 7/2011 | Wengrovitz | |
| 2011/0194557 A1 | 8/2011 | Baban et al. | |
| 2011/0289267 A1 | 11/2011 | Flynn et al. | |
| 2011/0296277 A1 | 12/2011 | Flynn et al. | |
| 2012/0140650 A1 | 6/2012 | Bruhn | |
| 2012/0179869 A1 | 7/2012 | Flynn et al. | |
| 2012/0230186 A1 | 9/2012 | Lee et al. | |
| 2013/0067294 A1 | 3/2013 | Flynn et al. | |
| 2013/0097367 A1 | 4/2013 | Flynn et al. | |
| 2014/0241361 A1 | 8/2014 | Bosshart et al. | |
| 2014/0241362 A1 | 8/2014 | Bosshart et al. | |
| 2014/0244966 A1 | 8/2014 | Bosshart et al. | |
| 2014/0269288 A1* | 9/2014 | Crisan | H04L 47/2425 370/231 |
| 2014/0328180 A1 | 11/2014 | Kim et al. | |
| 2014/0328344 A1 | 11/2014 | Bosshart | |
| 2014/0334489 A1 | 11/2014 | Bosshart et al. | |
| 2014/0334819 A1 | 11/2014 | Mehrvar et al. | |
| 2015/0010000 A1 | 1/2015 | Zhang et al. | |
| 2015/0138976 A1 | 5/2015 | Lu et al. | |
| 2015/0139235 A1 | 5/2015 | Lu et al. | |
| 2015/0160879 A1 | 6/2015 | Flynn et al. | |
| 2015/0281131 A1 | 10/2015 | Bhat et al. | |
| 2015/0334090 A1 | 11/2015 | Ling et al. | |
| 2016/0080263 A1 | 3/2016 | Park et al. | |
| 2016/0134563 A1* | 5/2016 | Yu | H04L 12/4641 370/392 |
| 2016/0216913 A1 | 7/2016 | Bosshart | |
| 2016/0301603 A1 | 10/2016 | Park et al. | |
| 2016/0330127 A1 | 11/2016 | Kim et al. | |
| 2017/0005933 A1* | 1/2017 | Toncelli | B24B 7/005 |
| 2017/0034058 A1 | 2/2017 | Sampath et al. | |
| 2017/0048312 A1 | 2/2017 | Moyer | |
| 2017/0126588 A1 | 5/2017 | Anand et al. | |
| 2017/0134283 A1* | 5/2017 | Iles | H04L 47/12 |
| 2017/0134538 A1 | 5/2017 | Mahkonen et al. | |
| 2017/0142011 A1 | 5/2017 | Zhang et al. | |
| 2017/0163538 A1 | 6/2017 | Feng et al. | |
| 2017/0180273 A1 | 6/2017 | Daly et al. | |
| 2017/0195253 A1 | 7/2017 | Annaluru et al. | |
| 2017/0195292 A1 | 7/2017 | Pham et al. | |
| 2017/0222926 A1 | 8/2017 | Mack-Crane et al. | |
| 2017/0289034 A1 | 10/2017 | Bosshart et al. | |
| 2017/0289048 A1* | 10/2017 | Chao | H04L 43/0864 |
| 2017/0295074 A1 | 10/2017 | Chandran et al. | |
| 2018/0034740 A1* | 2/2018 | Beliveau | H04L 43/0852 |
| 2018/0041615 A1 | 2/2018 | Bosshart et al. | |
| 2018/0367338 A1 | 12/2018 | Seshadri | |
| 2019/0116132 A1 | 4/2019 | Suzuki | |
| 2019/0379591 A1* | 12/2019 | Boughzala | H04L 47/115 |

OTHER PUBLICATIONS

Non-Published commonly Owned U.S. Appl. No. 15/161,262, filed May 22, 2016, 41 pages, Barefoot Networks, Inc.
Non-Published commonly Owned U.S. Appl. No. 15/836,528, filed Dec. 8, 2017, 30 pages, Barefoot Networks, Inc.
Non-Published commonly Owned U.S. Appl. No. 16/289,001, filed Feb. 28, 2019, 48 pages, Barefoot Networks, Inc.
First Office Action for U.S. Appl. No. 15/895,908, dated Jun. 28, 2019, 16 pages.
Notice of Allowance for U.S. Appl. No. 15/161,263, dated Dec. 3, 2018.
Notice of Allowance for U.S. Appl. No. 16/289,001, dated May 14, 2020.
Office Action for U.S. Appl. No. 15/161,262, dated Jul. 30, 2019.
Office Action for U.S. Appl. No. 15/161,262, dated Mar. 27, 2020.
Office Action for U.S. Appl. No. 15/161,262, dated Oct. 19, 2017.
Office Action for U.S. Appl. No. 15/161,263, dated Jan. 18, 2018.
Office Action for U.S. Appl. No. 15/161,263, dated Jul. 24, 2018.
Office Action for U.S. Appl. No. 16/289,001, dated Jan. 23, 2020.
Office Action for U.S. Appl. No. 16/810,727, dated Jan. 11, 2019.
Office Action for U.S. Appl. No. 16/810,727, dated Jun. 18, 2018.

* cited by examiner

IDENTIFYING CONGESTION IN A NETWORK

CLAIM OF BENEFIT TO PRIOR APPLICATIONS

This application is a continuation of U.S. patent application Ser. No. 15/895,908, filed Feb. 13, 2018. The entire specification of that patent application is hereby incorporated herein by reference in its entirety.

BACKGROUND

Identifying congestion in a network has been a long-term goal in the field of networking. Many schemes have been proposed to date for identifying and avoiding congested segments of a network. However, most of these schemes still cannot rapidly detect congestion. This is often because most of the proposed solutions require control plane processes to detect queue congestion. Accordingly, there is a need for forwarding elements with robust data plane congestion identification, and a reporting mechanism that can detect congestion within the data plane in real time at data line rates that the forwarding elements forward data messages.

SUMMARY

Some embodiments of the invention provide a method for reporting congestion in a network that includes several forwarding elements. Each forwarding element in some embodiment includes a data plane circuit that includes several ingress pipelines, several egress pipelines, and a switching circuit that directs data messages between ingress and egress pipelines. In a data plane circuit of one of the forwarding elements, the method detects that a queue in the switching circuit of the data plane circuit is congested, while a particular data message is stored in the queue as it is being processed through the data plane circuit. In the data plane circuit, the method then generates a report regarding the detected queue congestion, and sends this report to a data collector external to the forwarding element.

To send the report, the data plane circuit in some embodiments duplicates the particular data message, stores it in the duplicate data message information regarding the detected queue congestion, and sends the duplicate data message to the external data collector. In some embodiments, the method defines a destination address of the duplicate data message to be a network address of the data collector. To do this, the method in some embodiments encapsulates the duplicate data message with an outer header (e.g., a tunnel header) that specifies the data collector's network address (e.g., IP address) as the destination address. This outer header in some embodiments includes a source address that is the network address (e.g., IP address) of the forwarding element.

In other embodiments, the method forwards the duplicate message to the data collector by replacing an initial destination address stored in the duplicate data message with the network address of the data collector. This approach, however, corrupts the original header data of the data message. Hence, instead of this approach, some embodiments encapsulate the duplicate data message with an outer header, as described above. This encapsulation preserves the original header of the data message, so that the data collector can use this information to identify the data message flows that caused the congestion and/or that experienced the congestion. In some of the embodiments that encapsulate the duplicate data message, or modify the existing header of the duplicate data message, the method eliminates from the duplicate data message at least a portion of a payload of the original data message in order to reduce the amount of data sent to the data collector.

In some embodiments, an egress pipeline includes several message processing stages. A message processing stage of an egress pipeline in some embodiments detects the queue that was congested while storing the particular data message, and designates the processed data message for duplication and forwarding to the data collector. In some embodiments, this or another stage of the egress pipeline directs the duplicate data message back to the switching circuit with one or more congestion values that quantify the detected queue congestion, as further described below. With the duplicate data message, the switching circuit also receives an egress queue/port identifier that identifies a particular data plane egress queue/port to which the switching circuit should direct the duplicate data message. This particular egress queue/port is associated with the external data collector in a record of the data plane circuit (e.g., in table of a message processing stage of an ingress or egress pipeline).

Different embodiments use a different egress queue/port identifier to identify the particular data plane egress queue/port to which the switching circuit should direct the duplicate data message. In some embodiments, the identifier is an index value that the switching circuit maps to a particular egress port, and/or to one of its egress queues that is associated with a particular egress port. In other embodiments, this identifier directly identifies the particular egress port or the switching-circuit egress queue that is associated with the particular egress port.

In some embodiments, an ingress or egress message processing stage specifies the egress queue/port identifier. This ingress or egress message processing stage in some embodiments specifies this identifier after using a load balancing operation to select the data collector from a set of data collectors. While processing the original data message before the queue congestion has been detected, an ingress message processing stage in some embodiments performs this load balancing operation to select a potential data collector for the original data message. This is because in these embodiments it is the job of the ingress message processing stages to specify an egress port/pipeline for a data message. In these embodiments, an egress message processing stage uses the egress queue/port identifier specified by the ingress message processing stage for the duplicate data message when this egress processing stage or an earlier egress processing stage determines that the original data message experienced queue congestion.

After receiving the duplicate data message, the switching circuit directs the duplicate data message to a particular egress pipeline associated with the particular egress port that is identified by the egress queue/port identifier. As mentioned above, the duplicate data message includes one or more congestion values to report to the external data collector. In some embodiments, the particular egress pipeline that receives the duplicate data message from the switching circuit then specifies the external data collector's network address (e.g., IP address) for the duplicate data message. As mentioned above, this is done in some embodiments by using an outer header for the duplicate data message and recording the data collector's network address as the destination address of the outer header. The particular egress pipeline then supplies the duplicate data message to a data plane egress port from where this message is supplied to a forwarding-element port that is associated with the external data collector.

In some embodiments, the report that is sent to the external data collector provides congestion data regarding the queue. Different embodiments express the congestion data differently. In some embodiments, the congestion data includes queue latency that expresses the delay experienced by the particular data message while being stored in the queue, while entering and exiting the switching circuit, or while entering an ingress pipeline and exiting the switching circuit. In some embodiments, one of the message processing stages of the egress pipeline computes the queue latency based on ingress and egress time stamps recorded for the processed original message (e.g., by the switching circuit for particular data message, or by a data plane component when the message was received by the data plane or supplied to an ingress pipeline, and by the switching circuit as the data message leaves a switching circuit egress queue).

Instead of reporting the queue latency, the report in some embodiments includes the ingress and egress time stamps that are recorded for the processed original message, so that the data collector can compute the queue latency from these values. Conjunctively, or alternatively, the congestion data in the queue report in some embodiments includes the queue depth. In some embodiments, the queued depth specifies the number of messages in the queue when the switching circuit stored the particular data message in the queue.

In some embodiments, one of the message processing stages of the egress pipeline detects that the queue is congested by receiving a congestion value for the queue and determining that the congestion value exceeds a threshold congestion value. The method in some embodiments only reports significant changes to the congestion of a queue to the external data collector. Accordingly, in these embodiments, the method foregoes reporting another congestion value for the queue that it receives while processing another data message, when this other congestion value is within a particular range of the previous congestion value that the method reported for the queue to the external data collector. However, when another congestion value for another data message is not within a particular range of the previous congestion value that the method reported for the queue, the method in these embodiments reports this other congestion value to the external data collector.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
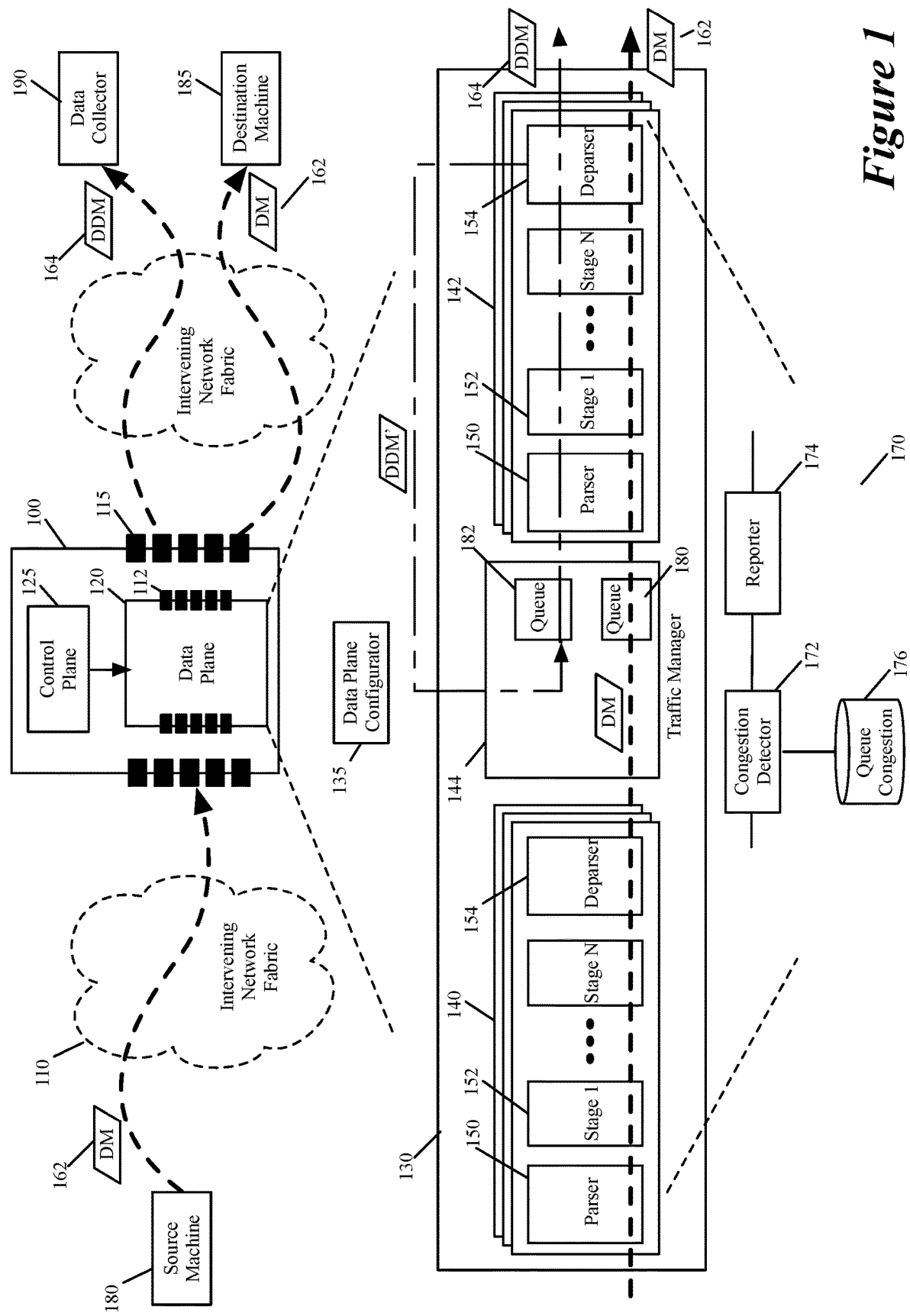
FIG. 1 illustrates an example of a forwarding element with a data plane that can detect and report queue congestion in real time and data line rates.

In the following detailed description of the invention, numerous details, examples, and embodiments of the invention are set forth and described. However, it will be clear and apparent to one skilled in the art that the invention is not limited to the embodiments set forth, and that the invention may be practiced without some of the specific details and examples discussed.

Some embodiments of the invention provide a method for reporting congestion in a network that includes several forwarding elements. Each forwarding element in some embodiments includes a data plane circuit that includes several ingress pipelines, several egress pipelines, and a switching circuit that directs data messages between ingress and egress pipelines. In some embodiments, each ingress or egress pipeline includes several message processing stages.

In a data plane circuit of one of the forwarding elements, the method detects that a queue in the switching circuit of the data plane circuit is congested while a particular data message is stored in the queue as it is being processed through the data plane circuit. In the data plane circuit, the method then generates a report regarding the detected queue congestion and sends this report to a data collector external to the forwarding element. The report in some embodiments provides congestion data regarding the queue.

Different embodiments express the congestion data differently. In some embodiments, the congestion data includes queue latency, which expresses the delay experienced by the particular data message while being stored in a switching circuit queue, while entering and exiting the switching circuit, or while entering an ingress pipeline and exiting the switching circuit. In some embodiments, one of the message processing stages of the egress pipeline computes the queue latency based on ingress and egress time stamps recorded for the processed original message (e.g., by the switching circuit for particular data message, or by a data plane component when the message was received by the data plane or supplied to an ingress pipeline, and by the switching circuit as the data message left a switching circuit egress queue).

Instead of reporting the queue latency, the report in some embodiments includes the ingress and egress time stamps that are recorded for the processed original message, so that the data collector can compute the queue latency from these values. Conjunctively, or alternatively, the congestion data in the queue report in some embodiments includes the queue depth. In some embodiments, the queued depth specifies the number of messages in the queue when the switching circuit stored the particular data message in the queue.

In some embodiments, one of the message processing stages of the egress pipeline detects that the queue is congested by receiving a congestion value for the queue and determining that the congestion value exceeds a threshold congestion value. The method in some embodiments only reports significant changes to the congestion of a queue to the external data collector. Accordingly, in these embodiments, the method foregoes reporting another congestion value for the queue that it receives, while processing another data message, when this other congestion value is within a particular range of the previous congestion value that the method reported for the queue to the external data collector. However, when another congestion value for another data message is not within a particular range of the previous congestion value that the method reported for the queue, the method in these embodiments reports this other congestion value to the external data collector.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

FIG. 1 illustrates an example of a forwarding element 100 that detects and reports queue congestion in its data plane circuit 120 (data plane). While forwarding a data message sent from a source machine 180 to a destination machine 185, the data plane 120 of the forwarding element can detect the queue congestion, and report the queue congestion to an external data collector 190 by duplicating the data message and embedding data regarding the queue congestion in the duplicate data message. The forwarding element 100 can be any type of forwarding element in a network, such as a switch, a router, a bridge, etc., or any type of middlebox appliance in the network.

In this example, the forwarding element 100 is a non-edge forwarding element that receives a data message 162 from a source machine 180 and sends the data message 162 to a destination machine 185 through intervening network fabric 110, which includes one or more forwarding devices (such as switches, routers, other network devices, etc.). In other embodiments, the forwarding element 100 is an edge forwarding element that is deployed at the edge of the network to connect to compute devices (e.g., standalone or host computers) that serve as sources and destinations of the data messages. A non-edge forwarding element forwards data messages between forwarding elements in the network, while an edge forwarding element forwards data messages to and from edge computing devices to each other, to other edge forwarding elements, and to non-edge forwarding elements.

Figure 2:
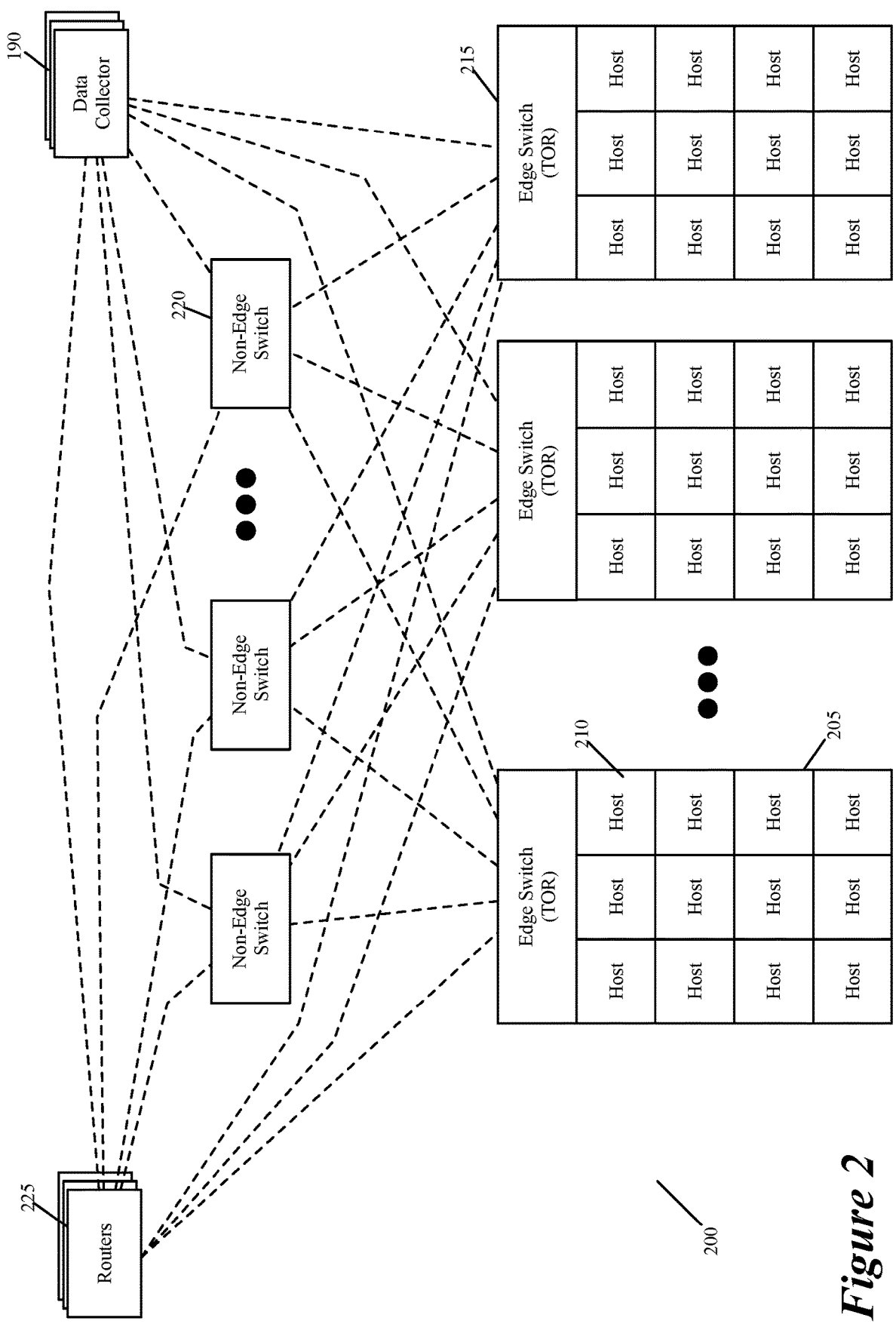
FIG. 2 illustrates an example of a network that includes several forwarding elements at the edge and non-edge locations of the network to perform different operations.

FIG. 2 illustrates an example of a network 200 that includes several forwarding elements 100 at the edge and non-edge locations of the network to perform different operations. This network has multiple racks 205 of host computers 210, with each rack having a top-of-rack (TOR) switch 215 that is an edge switch. The TOR switches are connected by several spine switches 220, which are non-edge forwarding elements. The TOR and spine switches also connect to several routers 225, which are also non-edge forwarding elements. In some embodiments, the data plane of a TOR switch 215, a spine switch 220, and a router 225 detects congestions in its queues while processing data messages, and reports the detected queue congestions to a remote data collector 190. The data collector 190 in some embodiments is a separate device, or executes on a separate device than the forwarding elements (e.g., elements 100, 215, 220, 225, etc.). In other embodiments, the data collector 190 executes on one or more of the forwarding elements.

As shown in FIG. 1, the forwarding element 100 includes (1) physical ports 115 that receive data messages from, and transmit data messages to, devices outside of the forwarding element, (2) a data plane circuit 120 that performs the forwarding operations of the forwarding element 100 (e.g., that receives data messages and forwards the data messages to other devices), and (3) a control-plane circuit ("control plane") 125 that provides a configuration interface for configuring the forwarding behavior of the data plane forwarding circuit.

The control plane 125 configures the data plane 120. In some embodiments, the control plane includes (1) one or more processors that execute instructions, and (2) a memory that stores instructions. The instructions for the control plane processor(s) can be specified by (1) a manufacturer of the network forwarding element 100, (2) a network administrator that deploys and maintains the network forwarding element 100, or (3) one or more automated processes that execute on servers and/or network forwarding elements that monitor network conditions. In some embodiments, each control plane processor is a microprocessor with multiple processing cores. Examples of such a microprocessor include any off-the-shelf processors commonly available today. In contrast to the off-the-shelf microprocessor(s) for the control plane, the data plane 120 is an application specific integrated circuit (ASIC) in some embodiments.

As further shown, the data plane 120 includes ports 112, configurable message processing circuits 130 and a data-plane configurator 135. In some embodiments, several ports 112 receive data messages from and forward data messages to ports 115 of the forwarding element 100. For instance, in some embodiments, N data-plane ports 112 (e.g., four ports 112) are associated with each port 115 of the forwarding element. The N-ports 112 for each port 115 are viewed as N-channels of the port 115. In some embodiments, several data-plane ports 112 are associated with other modules (e.g., data plane configurator, traffic manager, etc.) of the data plane 120.

The configurable message-processing circuits 130 perform the configurable data-plane forwarding operations of the forwarding element to process and forward data messages to their destinations. The data-plane configurator 135 can configure the message-processing circuits 130 based on configuration data supplied by the control-plane circuit 125. In some embodiments, the configurable message-forwarding circuits 130 of the data plane include several ingress processing pipelines 140, several egress processing pipelines 142, and a traffic management stage 144 between the ingress and egress processing pipelines 140 and 142. In some embodiments, each ingress or egress pipeline is associated with one or more data-plane ports 112 and through this association is associated with one or more physical ports 115 of the forwarding element 100.

Also, in some embodiments, each ingress or egress pipeline includes a parser 150, several message-processing stages 152, and a deparser 154. A pipeline's parser 150 extracts a message header from a data message that the pipeline receives for processing. In some embodiments, the extracted header is in a format of a header vector (HV), which can be modified by successive message processing stages as part of their message processing operations. The parser of a pipeline passes the payload of the message to the deparser 154 as the pipeline's message-processing stages 152 operate on the header vectors. In some embodiments, the parser of a pipeline also provides the message's header to the deparser of its pipeline.

When a pipeline finishes processing a data message and the message has to be provided to the traffic management stage 144 in case of an ingress pipeline, or to a port 112 of the data plane in case of an egress pipeline (e.g., to forward to a forwarding-element port 115 so that it can be forwarded to the message's next hop), a deparser of the pipeline in some embodiments produces the data message header from the message's header vector that was processed by the last message processing stage and combines the produced header with the data message's payload. In the embodiments where the parser provides the message's header to the deparser, the deparser can also use this header when it combines the produced header with the data message's payload.

The traffic manager 144 receives the data messages output from the deparsers 154 of the ingress pipelines 140. The traffic manager (TM) serves as a crossbar switch that directs messages between different ingress and egress pipelines. Hence, the switching fabric of the traffic manager forwards data messages from ingress pipelines to egress pipelines based on message parameters, such as header vector parameters that the ingress processing pipelines produce while processing the messages. In performing its operations, the traffic manager stores the data messages in several queues. These queues can be assigned different priorities in some embodiments, and these priorities can determine the rate at which the messages are read out of the queues. The traffic manager uses these priorities and queues in some embodiments to provide different QoS (Quality of Service) treatment to different message flows.

In an ingress or egress pipeline, each message-processing stage includes message-processing circuitry for processing received data messages by performing one or more operations based on header vectors associated with the data messages. In some embodiments, each message-processing stage includes a match-action unit (MAU) that includes message-processing circuitry for forwarding received data messages and/or performing stateful operations based on these data messages. An MAU performs these operations by processing values stored in the header vectors of the data messages, as received from the message parser 150 or from a previous MAU 152 in its message processing pipeline. For instance, in some embodiments, an MAU tries to match data tuples (e.g., values from the header vectors) of messages with table records that specify actions to perform on the data tuples.

In addition to processing messages as part of their forwarding operations, the MAU stages 152 of the ingress and egress pipelines can also be configured to implement a data-plane congestion detecting and reporting circuit 170 along with the traffic manager 144. In some embodiments, the same data plane components that can be configured to perform message forwarding operations in the data plane can also be configured to perform congestion detection and reporting in the data plane. In some embodiments, the MAU stages can be configured to implement a congestion detection/reporting circuit 170 as they include stateful processing units (e.g., stateful arithmetic logic units, ALUs) that allow the MAUs to store records identifying current and/or past congestion values for one or more queues of the traffic manager 144.

As shown, the congestion detecting and reporting circuit 170 includes a congestion detector 172, a congestion reporter 174 and a queue-congestion storage 176. While the data plane processes data messages for forwarding, the congestion detector 172 detects when any particular data message experiences congestion while being processed by the data plane (e.g., while being stored in a queue of the traffic manager 144). When such a congestion is detected, the congestion reporter 174 can send a report to the external data collector 190 regarding this congestion. In some embodiments, the congestion reporter 174 does not report all incidences of queue congestion. For instance, in some embodiments, the congestion reporter 174 only reports incidences of queue congestion that are designated for reporting by the congestion detector 172, and the congestion detector 172 designates only a subset of detected queue congestions for reporting.

In some embodiments, the congestion reporter sends a congestion report to the data collector 190 by replicating the processed data message that experienced the congestion, and embedding information about the detected congestion in the replicated message copy, referred to below as the duplicate message. In some embodiments, the congestion reporter 174 specifies the network address (e.g., the IP address) of data collector 190 as the destination address of the duplicate message. To do this, the congestion reporter 174 in some embodiments encapsulates the duplicate data message with an outer header (e.g., a tunnel header) that specifies the data collector's network address (e.g., IP address) as the destination address. This outer header in some embodiments includes a source address that is the network address (e.g., IP address) of the forwarding element.

In other embodiments, the reporting circuit forwards the duplicate message to the data collector by replacing an initial destination address stored in the duplicate data message with the network address of the data collector. This approach, however, corrupts the original header data of the data message. Hence, instead of this approach, some embodiments encapsulate the duplicate data message with an outer header, as described above. This encapsulation preserves the original header of the data message, so that the data collector can use this information to identify the data message flows that caused the congestion and/or that experienced the congestions. In some of the embodiments that encapsulate the duplicate data message or modify the existing header of the duplicate data message, the method discards from the duplicate data message at least a portion of a payload of the original data message, in order to reduce the amount of data sent to the data collector.

In different embodiments, the congestion detector 172 examines different congestion metrics to ascertain whether a TM queue is congested. In some embodiments, the queue congestion metric is queue depth, which expresses the number of data messages stored in a TM queue that stored the processed data message. The traffic manager stores the queue depth in the data message's header so that an MAU of the egress pipeline can then use this value to perform its congestion detection operation. In other embodiments, the queue congestion metric is queue latency, which is the latency experienced by a processed data message that is stored by a queue of the traffic manager. In still other embodiments, the queue congestion is a combination of queue depth and/or queue latency.

Queue latency in some embodiments is defined as the difference between the time that the message enters and exits the TM. In some embodiments, the TM records ingress and egress time stamps for a message as the message enters and exits the traffic manager. Accordingly, in some embodiments, the egress time stamp expresses the time that the message leaves an egress queue of the traffic manager, while the ingress time stamp expresses the time that the message is stored in an ingress queue of the traffic manager. In other embodiments, the ingress and egress times stamps express the time that the message enters and leaves an egress queue of the traffic manager. In still other embodiments, the ingress time stamp is specified by a data plane component when the message was received by the data plane, or supplied to an ingress pipeline, while the egress time stamp is specified by the switching circuit when the data message leaves a switching circuit egress queue.

In some embodiments, one or more data plane components (e.g., the traffic manager) store the ingress and egress time stamps in the data message's header so that an MAU of the egress pipeline can then compute the queue latency from these stored values, as further described below. Instead of reporting the queue latency, one or more of the data plane components may include ingress and egress time stamps for the processed original message in the duplicate data message, so that the data collector 190 can compute the queue latency from these values.

In some embodiments, the congestion detector is implemented by a set of one or more MAUs 152 in an egress pipeline. When the congestion metric includes queue latency, one MAU 152 in an egress pipeline in some embodiments computes the queue latency experienced by a data message by subtracting the ingress time stamp from the egress time stamp. As mentioned above, the traffic manager inserts these time stamps in the message header in some embodiments. A parser 150 of the egress pipeline then puts these time stamps in the data message's associated header vector. In some embodiments, the same MAU that computes the queue latency, or another MAU, then determines whether the computed queue latency is greater than (or greater than or equal to) a threshold latency value. If so, this MAU stores a value in the message's header vector to designate this message for replication and reporting to a data collector 190.

When the congestion metric includes queue depth, one MAU of the egress pipeline in some embodiments determines whether the queue depth is greater than (or greater than or equal to) a threshold queue depth. If so, this MAU stores a value in the message's header vector to designate this message for replication and reporting to the data collector 190. Some embodiments perform the thresholding operation by accounting for both queue depth and queue latency, and only report queue congestion when a thresholding determination that is based on both of these factors specifies that the congestion has to be reported.

To reduce the number of reports that are sent to the data collector 190, the congestion detector 172 in some embodiments does not report every detected congestion when the congestion metric (e.g., queue latency and/or queue depth) exceeds (or at least matches) a threshold value. For instance, some embodiments discretize the range of values for a congestion metric into a number of discrete quantized states, and only report congestion metrics for a queue when the queue congestion changes from one quantized state to another quantized state. In some of these embodiments, the congestion detector 172 (e.g., the set of one or more egress-pipeline MAUs that implement this detector) only reports queue congestion (1) when the new quantized state is above a threshold congestion value, or (2) when the new quantized state is below the threshold congestion value, but the previously reported queue congestion value was above the threshold congestion value.

In some such embodiments, the congestion detector stores in the queue congestion storage 176 a congestion value for each tracked queue (e.g., each egress queue) of the traffic manager. In some embodiments, an egress-pipeline MAU 152 that is used to implement the congestion detector 172 stores the queue congestion values in its stateful storage (e.g., in its stateful ALU). In other words, the queue congestion storage 176 is the stateful storage(s) of one or more MAUs in some embodiments.

In the queue congestion storage 176, a queue's stored congestion value is the last reported congestion value for the queue, or a null value when no congestion value was previously reported for the queue. After receiving a new congestion value for a queue, the congestion detector 172 in some embodiments determines whether the new congestion value is in a different quantized state as the previously reported congestion value that is stored in the queue congestion storage 176 for the queue. If not, the congestion detector does not report the new congestion value.

On the other hand, when the new congestion value is in another quantized state and this new state is above a threshold value, the congestion detector records in the processed message's header vector that the message should be replicated, and the new congestion value should be reported by the duplicate message to the data collector 190. Also, when the new congestion value is in another quantized state that is less than a threshold value, but the previously reported queue congestion value was above the threshold congestion value, the congestion detector records in the processed message's header vector that the message should be replicated and the new congestion value should be reported by the duplicate message to the data collector 190. Even though this congestion value is less than the threshold value, it is reported to the data collector so that the data collector will know that the congestion has been alleviated on the queue at issue.

Some embodiments perform other variations of the thresholding and discretizing approaches mentioned above. For instance, in some embodiments, the congestion detector 172 uses the thresholding approach for the first N data messages (e.g., first 10,000 messages) processed through the data plane 120, or through a particular TM queue. After these N data messages, the congestion detector 172 then uses the discretizing approach by which it only reports queue congestions that fall in different quantized congestion states instead of the last reported congestion value so long as the new quantized congestion value is above a threshold value, or is below the threshold value, but the previously reported congestion value for the queue at issue was above the threshold value.

Whenever a congestion detector designates a particular message for replication so that the queue congestion that it experienced can be reported, the congestion reporter 174 replicates the data message, and embeds information about the detected congestion in the duplicate message, as mentioned above. In some embodiments, the congestion reporter 174 is implemented by (1) a deparser 154 of the egress pipeline 142 that detects the congestion and (2) the traffic manager 144.

To designate a particular data message for replication, an MAU that implements the congestion detector 172 marks the header vector (e.g., sets a replication field in the header vector) associated with the data message. When the deparser 154 identifies the replication marking in the message's header vector, the deparser directs a copy of the data message to a data-plane port 112 that is forwarded back to the traffic manager. With this copy, the deparser also provides an egress queue/port identifier that identifies a particular egress queue/port to which traffic manager should direct the duplicate data message. This particular egress queue/port is associated with the external data collector in a record of the data plane circuit (e.g., in table of a message processing stage of an ingress or egress pipeline).

Different embodiments use a different egress queue/port identifier to identify the particular data plane egress queue/port to which the switching circuit should direct the duplicate data message. In some embodiments, the identifier is an index value that the traffic manager maps to a particular egress port and/or to one of the TM egress queues that is associated with a particular egress port. The control plane 125 in some embodiments defines a mapping table in the TM that maps the index values to egress queues/ports. In other embodiments, this identifier directly identifies the particular egress port or the TM egress queue that is associated with the particular egress port.

In some embodiments, an ingress or egress message processing stage specifies the egress queue/port identifier. This ingress or egress message processing stage in some embodiments specifies this identifier after using a load balancing operation to select the data collector in a cluster of several data collectors. While processing the original data message before the queue congestion has been detected, an ingress message processing stage in some embodiments performs this load balancing operation to select a potential data collector for the original data message. This is because in these embodiments it is the job of the ingress message processing stages to specify an egress port/pipeline for a data message. In these embodiments, an egress message processing stage uses the egress queue/port identifier specified by the ingress message processing stage for the duplicate data message when this egress processing stage or an earlier egress processing stage determines that the original data message experienced queue congestion.

After receiving the duplicate data message, the traffic manager directs the duplicate data message to a particular egress pipeline associated with the particular egress port that is identified by the egress queue/port identifier. FIG. 1 illustrates the deparser 154 sending back to the traffic manager a duplicate data message DDM' that is a replicated copy of a data message DM that the traffic manager previously processed through an egress queue 180. As shown, the traffic manager directs this duplicate data message DDM' through another egress queue 182 that is associated with a particular egress pipeline for processing data message that are to be supplied to a data plane port 112 associated with the data collector 190.

As mentioned above, the duplicate data message includes one or more congestion values to report to the external data collector. In some embodiments, the particular egress pipeline that receives the duplicate data message from the traffic manager also records the external data collector's network address (e.g., IP address) in the duplicate data message. In some embodiments, this is done by encapsulating the duplicate data message with an outer header and recording the data collector's network address as the destination address of the outer header. FIG. 1 illustrates the duplicate data message being processed by an egress pipeline. This egress pipeline supplies the duplicate data message to a data plane egress port 112 that in a record of the data plane forwarding circuit is associated with the external data collector. From this port, the duplicate data message is then supplied to the forwarding-element port 115 that forwards this message to the external data collector 190 through intervening network fabric.

By virtue of operating in the data plane 120, the congestion detector 172 can detect and report queue congestion at the data-plane line rate (i.e., at the rate at which the data plane processes data messages for forwarding). Because of its operational speed, the congestion detector can quickly identify queue congestion at a forwarding element in the network.

Figure 3:
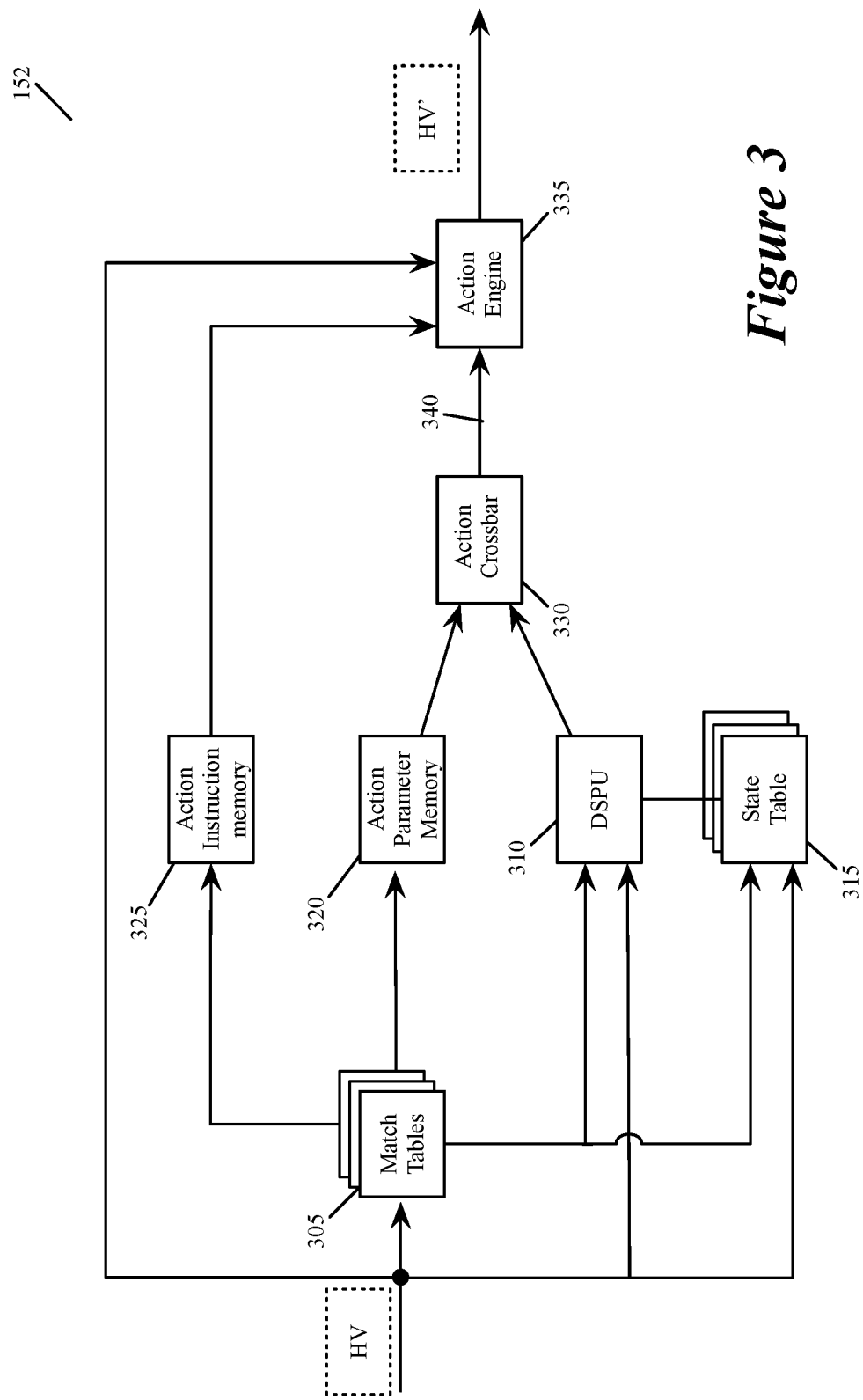
FIG. 3 illustrates an example of a match-action unit of some embodiments.

FIG. 3 illustrates an example of a match-action unit (MAU) 152 of some embodiments. As mentioned above, an ingress pipeline 140 or egress pipeline 142 in some embodiments has several MAU stages 152, each of which includes message-processing circuitry for forwarding received data messages and/or performing stateful operations based on these data messages. An MAU performs these operations by processing values stored in the header vectors of the data messages, as received from the message parser 150 or from a previous MAU 152 in its message processing pipeline.

As shown in FIG. 3, the MAU 152 in some embodiments has a set of one or more match tables 305, a data plane stateful processing unit 310 (DSPU), a set of one or more stateful tables 315, an action crossbar 330, an action parameter memory 320, an action instruction memory 325, and an action engine 335. The match table set 305 can compare one or more fields in a received message's header vector (HV) to identify one or more matching flow entries (i.e., entries that match the message's HV). The match table set can be TCAM tables or exact match tables in some embodiments. In some embodiments, the match table set can be accessed at an address that is a value extracted from one or more fields of the message's header vector, or it can be a hash of this extracted value In some embodiments, the value stored in a match table record that matches a value from a message's header vector (e.g., the message's flow identifier), or that is accessed at a hash-generated address, provides addresses for the action parameter memory 320 and action instruction memory 325. Also, such a value from the match table can provide an address and/or parameter for one or more records in the stateful table set 315, and can provide an instruction and/or parameter for the DSPU 310. As shown, the DSPU 310 and the stateful table set 315 also receive a processed message's header vector. The header vectors can include instructions and/or parameters for the DSPU, while containing addresses and/or parameters for the stateful table set 315.

The DSPU 310 and the stateful table set 315 form the MAU's stateful sub-unit, which performs stateful operations, such as storing congestion values for the different queues of the traffic manager. The DSPU 310 in some embodiments performs one or more stateful operations, while a stateful table 315 stores state data used and generated by the DSPU 310. In some embodiments, the DSPU includes one or more programmable arithmetic logic units (ALUs) that perform operations synchronously with the dataflow of the message-processing pipeline (i.e., synchronously at the line rate). As such, the DSPU can process a different header vector on every clock cycle, thus ensuring that the DSPU would be able to operate synchronously with the dataflow of the message-processing pipeline. In some embodiments, a DSPU performs every computation with fixed latency (e.g., fixed number of clock cycles). Examples of such operations in some embodiments include storing queue congestion values and determining whether queue congestion values have to be reported (e.g., performing the thresholding and/or quantization operations).

The DSPU 310 output a set of action parameters to the action crossbar 330. The action parameter memory 320 also outputs a set of action parameters to this crossbar 330. The action parameter memory 320 retrieves the action parameter that it outputs from its record, which is identified by the address provided by the match table set 305. The action crossbar 330 in some embodiments maps the action parameters received from the DSPU 310 and action parameter memory 320 to an action parameter bus 340 of the action engine 335. This bus provides the set of action parameters to the action engine 335. For different data messages, the action crossbar 330 can map the action parameters from DSPU 310 and memory 320 differently to this bus 340. The crossbar can supply the action parameters from either of these sources in their entirety to this bus 340, or it can concurrently select different portions of these parameters for this bus in some embodiments.

The action engine 335 also receives a set of instructions to execute from the action instruction memory 325. This memory 325 retrieves the instruction set from its record that is identified by the address provided by the match table set 305. In some embodiments, the action engine 335 also receives the header vector for each message that the MAU processes. Such a header vector can also contain a portion, or the entirety of an instruction set to process, and/or a parameter set for processing the instruction set. In some embodiments, the data-plane configurator supplies flow entries (e.g., the ACL flow-match identifiers and/or action identifiers) in one or more MAU tables (e.g., at the direction of the local control plane 125).

The action engine 335 in some embodiments includes a parameter multiplexer and a very large instruction word (VLIW) processor. In some embodiments, the VLIW processor is a set of one or more ALUs. In some embodiments, the parameter multiplexer receives the parameter sets from the action crossbar 330 and input header vector, and outputs the parameters as operands to the VLIW processor according to the instruction set (from the instruction memory 335 or the header vector). The VLIW processor executes instructions (from the instruction memory 335 or the header vector) applied to operands received from the parameter multiplexer. The action engine 335 stores the output of its operation in the header vector in order to effectuate a message forwarding operation and/or stateful operation of its MAU stage 152. The output of the action engine 335 forms a modified header vector (HV') for the next MAU stage.

In other embodiments, the match tables 305 and the action tables 315, 320 and 325 of the MAU stage 152 can be accessed through other methods as well. For instance, in some embodiments, each action table 315, 320 or 325 can be addressed through a direct addressing scheme, an indirect addressing scheme, and an independent addressing scheme. The addressing scheme that is used depends on the configuration of the MAU stage, which in some embodiments, is fixed for all data messages being processed, while in other embodiments can be different for different data messages being processed.

In the direct addressing scheme, the action table uses the same address that is used to address the matching flow entry in the match table set 305. As in the case of a match table 305, this address can be a hash generated address value or a value from the header vector. Specifically, the direct address for an action table can be a hash address that a hash generator (not shown) of the MAU generates by hashing a value from one or more fields of the message's header vector. Alternatively, this direct address can be a value extracted from one or more fields of the header vector.

On the other hand, the indirect addressing scheme accesses an action table by using an address value that is extracted from one or more records that are identified in the match table set 305 for a message's header vector. As mentioned above, the match table records are identified through direct addressing or record matching operations in some embodiments.

The independent address scheme is similar to the direct addressing scheme except that it does not use the same address that is used to access the match table set 305. Like the direct addressing scheme, the table address in the independent addressing scheme can either be the value extracted from one or more fields of the message's header vector, or it can be a hash of this extracted value. In some embodiments, not all the action tables 315, 320 and 325 can be accessed through these three addressing schemes, e.g., the action instruction memory 325 in some embodiments is accessed through only the direct and indirect addressing schemes.

The traffic management stage 144 provides the hardware switching fabric that directs a data message from one ingress pipeline 140 to an egress pipeline 142 (e.g., an egress pipeline associated with the forwarding-element port 115 from which the data message has to exit the data plane). This stage also has numerous queues for storing the data messages, and through these queues and their associated scheduling, this stage can perform quality of service (QoS) operations in order to ensure the desired throughput and service through the forwarding element.

Figure 4:
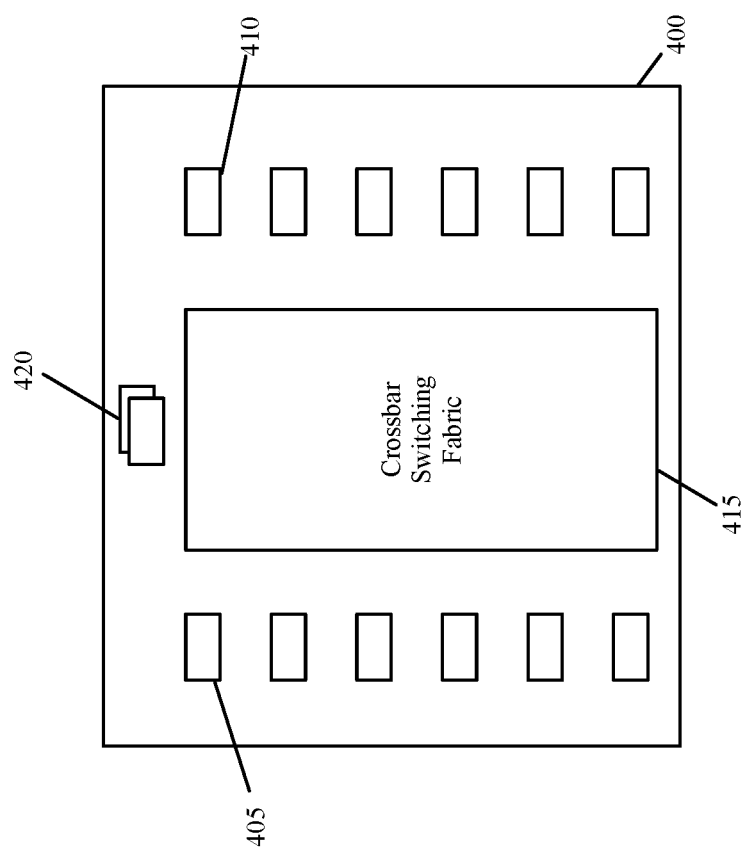
FIG. 4 illustrates an example of the traffic management stage of some embodiments.

FIG. 4 illustrates an example of the traffic management stage 144 of some embodiments. As shown, the traffic manager 400 includes ingress queues 405, egress queues 410, mirror queues 420 and hardware switching fabric 415. In some embodiments, each ingress queue is associated with an ingress pipeline 140, while each egress queue is associated with an egress pipeline 142. The mirror queues 420 are used to store data messages (e.g., duplicate data messages) sent back from the deparsers of the egress pipelines.

The switching fabric 415 directs a data message from an ingress queue 405 of an ingress pipeline 140 to an egress queue 410 of an egress pipeline 142. In some embodiments, the switching fabric is a crossbar switching fabric that forwards messages from ingress pipelines to egress pipelines based on header vector parameters that the ingress processing pipelines can modify while processing the messages. In some embodiments, the forwarding element's control plane 120 through the data-plane configurator 135 can specify the rates for data message inflow and/or outflow from the one or more queues in the traffic manager.

In some embodiments, the switching fabric 415 also directs a data message from a mirror queue 420 to an egress queue 410 of an egress pipeline 142. In some embodiments, the switching fabric forwards messages from mirror queues to the egress queues based on parameters that an ingress or egress message processing stage 152 specified while processing the messages. In some embodiments, the forwarding element's control plane 120 through the data-plane configurator 135 specifies mappings that allow the traffic manager 400 to map these parameters to egress queues 410 in order to direct messages between the mirror queues and egress queues.

Figure 5:
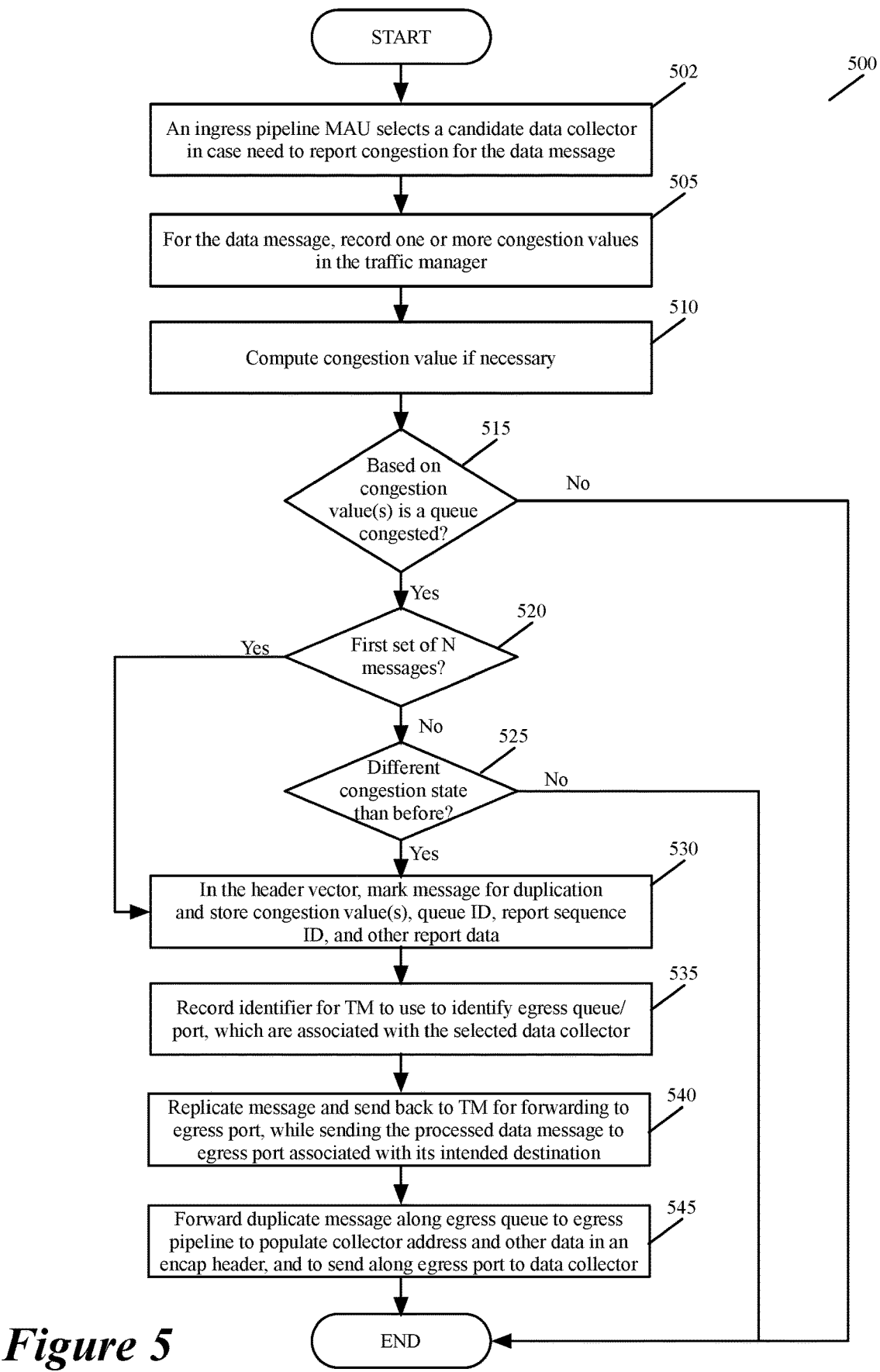
FIG. 5 illustrates a congestion detection/reporting process that the data plane performs in some embodiments to detect and report queue congestion.

FIG. 5 illustrates a congestion detection/reporting process 500 that the data plane 120 performs in some embodiments to detect and report queue congestion. The data plane 120 performs this process while performing forwarding operations on a data message to forward the message to its destination. As shown, the congestion detection/reporting process 500 initially has an ingress pipeline MAU select (at 502) a data collector from a cluster of several data collectors as the potential data collector for the data message in case an egress pipeline MAU determines that the data message has experienced queue congestion.

Next, at 505, the traffic manager records (at 505) one or more congestion values in the header of the data message as the message passes through the traffic manager. The traffic manager records different congestion values in different embodiments. In some embodiments, the traffic manager records the queue depth of the egress queue 410 in which it stored the data message while the data message was passing through the traffic manager. Queue depth in some embodiments expresses the number of data messages stored in the egress queue when the traffic manager stored the data message in this queue.

In other embodiments, the traffic manager records the queue latency that the data message experienced as it passed through the traffic manager in general or as it passed through an egress queue 410 of the traffic manager. Thus, in some embodiments, the traffic manager records ingress and egress time stamps for a message as the message enters the traffic manager (i.e., is stored in an ingress TM queue 405) and exits the traffic manager (i.e., is retrieved from an egress TM queue 410). In other embodiments, the traffic manager records ingress and egress time stamps for a message as the message enters an egress queue 410 of the traffic manager (i.e., is stored in an egress TM queue 410) and exits the egress queue (i.e., is retrieved from the egress TM queue 410).

In still other embodiments, the ingress time stamp is specified by a data plane component when the message was received by the data plane or supplied to an ingress pipeline, while the egress time stamp is specified by the switching circuit when the data message leaves a switching circuit egress queue. In some of these embodiments, the ingress time stamp is stored in the data message's associated header vector by the data plane component before the data message reaches the traffic manager. Also, in some embodiments, the traffic manager stores both the queue depth and queue latency in the processed data message's header.

An egress pipeline's parser 150 parses the data message's header into a header vector that is then processed by the MAU stages 152 of the egress pipeline. In the embodiments where the congestion metric is queue latency, one of the egress pipeline's MAUs computes (at 510) the queue latency from the ingress and egress time stamps specified by the traffic manager at 505. Next, at 515, an MAU stage 152 of the egress pipeline determines whether the stored congestion value(s) and/or computed congestion value(s) for the data message and TM queue at issue specify that the data message has experienced queue congestion.

To make this determination, the MAU stage in some embodiments compares a stored or computed congestion value with a threshold queue congestion value for the TM queue at issue. In some embodiments, all the TM queues (e.g., all the TM egress queues) have the same threshold value, while in other embodiments, different TM queues (e.g., different TM egress queues) have different threshold values. When the MAU determines that the stored/computed congestion value does not exceed the threshold value (or in some embodiments is not at least equal to the threshold queue congestion value) for the TM queue at issue, the MAU foregoes designating the data message for replication (to report the stored or computed queue congestion value(s)) and the process 500 ends in some embodiments.

In other embodiments, the process does not end when the MAU determines (at 515) that the stored/computed congestion value does not exceed the threshold value (or in some embodiments is not at least equal to the threshold queue congestion value) for the TM queue at issue. In these embodiments, the same MAU or another MAU might still designate that the data message should be replicated and the stored/computed congestion value(s) recorded in the duplicate data message for reporting to the external data collector, when the MAU determines that the data plane circuit previously reported a congestion value for the queue. In these embodiments, the MAU so designates the data message because once the queue congestion falls below a threshold amount, the data collector should receive notification of the current uncongested state of the queue. To generate the duplicate message, record the lowered congested state of the queue in the duplicate message, and forward the duplicate message to the data collector, the data plane performs operations like operations 530-545, which will be described below for reporting queue congestion values when the queue congestion exceeds a threshold level.

When the MAU determines (at 515) that the stored/computed congestion value exceeds the threshold value (or in some embodiments is not at least equal to the threshold queue congestion value) for the queue at issue, the MAU determines (at 520) whether the data message is part of the first N set of messages processed by the data plane (or in some embodiments, whether the data message is part of the first N set of messages processed by the data plane for a particular TM queue). If so, the process transitions to 530 to designate the header vector of the data message with a designation that specifies that the data message should be replicated, and the duplicate message should be reported to the data collector with the congestion value.

On the other hand, when the data message is not part of the first N set of processed messages, the same MAU or another MAU determines (at 525) whether the stored or computed congestion value for the data message and TM queue at issue falls in a different quantized congestion state than the congestion value previously reported for the queue to the data collector 190. The control plane 125 in some embodiments configures one or more MAUs in an egress pipeline to map a detected queue congestion value to one of several discrete congestion value states, with each state corresponding to a different range of congestion values. To do this, the egress MAUs in some embodiments round the reported congestion value up, or down, or truncate the congestion value. In other embodiments, the egress MAUs use other techniques to identify a discrete congestion state for the data message and the queue at issue.

When an egress MAU determines (at 525) that the stored or computed congestion value for the data message does not fall in a different quantized congestion state than the congestion value previously reported for the queue to the data collector 190, the process ends. Otherwise, the process transitions to 530. To determine (at 525) whether the quantized congestion value for the data message falls in a different quantized congestion state than the previously reported congestion value, the egress MAU compares the quantized congestion value for the data message with a quantized congestion value that it stored in its stateful table 315 for the last time that it reported a congestion value for the queue to the data collector.

At 530, an egress pipeline MAU designates the header vector of the data message with a designation that specifies that the data message should be replicated, and the duplicate message should be reported to the data collector with the congestion value(s). At 530, the egress pipeline MAU in some embodiments stores in its stateful table 315 the congestion value(s) that it stores in the header vector for reporting to the data collector.

In some embodiments, the same MAU or another egress pipeline MAU also records (at 530) in the data message's header vector (1) identifiers that identify the forwarding element and the TM queue at issue, (2) identifiers that identify the forwarding-element, or data-plane, ingress and egress ports through which the data message passed, (3) identifiers that identify the ingress and egress pipelines that processed the data message, and/or (4) a report sequence identifier that would allow the data collector to place the reports for each particular queue of each particular forwarding element in a sequence and to detect when a report has been lost in transmission. As further described below, the duplicate data message is encapsulated with a header (e.g., a UDP header) that includes congestion reporting portion that includes these reported congestion data sets.

At 535, an egress pipeline MAU records in the data message's header vector an identifier for the traffic manager to use to identify the egress queue/port through which it needs to send the duplicate data message. In some embodiments, the egress pipeline MAU selects this identifier based on a data collector identifier that was stored in the header vector by the ingress pipeline MAU at 502. As mentioned above, the ingress pipeline MAUs in some embodiments select candidate data collectors while processing data messages.

Next, at 540, the deparser 154 of the egress pipeline replicates the message and sends the duplicate data message (e.g., DDM') back to the traffic manager. The duplicate data message's header includes the data recorded at 530 and 535 in the header vector. While replicating the data message and sending the duplicate message to the traffic manager, the deparser 154 provides the processed data message (e.g., DM 162) to its destined data plane egress port 112 from where it is supplied to the forwarding element port 115 and then forwarded to its destination machine 185.

At 545, the traffic manager retrieves the duplicate data message that it received and stored in one of its mirror queues 420, and uses the egress queue/port identifier in this message's header to identify an egress queue 410 through which this data message should be sent out of the TM. This egress queue 410 is associated with another egress pipeline that should process the duplication data message, and that should forward the duplicate data message to the egress port associated with the data collector in the data plane records.

At 545, one or more egress pipeline MAUs (1) encapsulate the duplicate data message with a header (e.g., a UDP header), (2) store the data collector's network address as the destination address (e.g., IP address) of the encapsulated duplicate data message, (3) store the forwarding elements network address as the source address (e.g., IP address) of the encapsulated duplicate data message, and (4) store the congestion values recorded at 530 and 535 in the congestion reporting portion of the encapsulated header. As mentioned above, the particular egress pipeline then supplies the duplicate data message to a data plane port 112 that in a record of the data plane forwarding circuit is associated with the external data collector. From this port, the duplicate data message is then supplied to the forwarding-element port 115 that is connected to the external data collector 190. After 545, the process ends.

While the invention has been described with reference to numerous specific details, one of ordinary skill in the art will recognize that the invention can be embodied in other specific forms without departing from the spirit of the invention. For instance, in some embodiments, the non-edge forwarding elements do not send queue congestion reports to the data collectors, but instead embed these reports in the data messages so that the edge forwarding elements (connected to the destinations of the data messages) can send one report regarding all of the queue congestions experienced by each message as it passed through several forwarding elements in its path.

Also, in some embodiments, the traffic manager 144 might drop a data message due to queue congestion. In some of these embodiments, the traffic manager creates a duplicate data message for this dropped data message, and forwards this duplicate data message to a data collector so that it can determine that the message was dropped. To do this, the traffic manager in some embodiments forwards the duplicate data message through one of its egress queues to an egress pipeline that will encapsulate the duplicate data message with an outer header that will be populated with the data collector's network address (as the destination address), the forwarding element's network address (as the source address), and data regarding the dropping of the data message (e.g., the queue ID, the forwarding element ID, a value specifying that the message was dropped, etc.).

Instead of sending reports regarding queue congestion directly to the data collector, the data plane of some embodiments sends these reports (e.g., sends duplicate data messages) to its forwarding elements control plane 125 (e.g., through a data-plane port 112 that sends messages to the data plane configurator 135, which then forwards the messages to the control plane 125). The control plane 125 then periodically, on-demand, or based on a set of collection metrics, forwards the queue congestion data in-band or out-of-band to a cluster of one or more data collectors. Thus, one of ordinary skill in the art would understand that the invention is not to be limited by the foregoing illustrative details, but rather is to be defined by the appended claims.

The invention claimed is:

1. A network element comprising:
a data plane circuit comprising an egress pipeline that comprises match-action stage message processing circuitry to detect that a particular data message experienced congestion while being stored in a queue in a traffic manager stage of the network element, the traffic manager stage being for use in transmitting message data between prioritized ingress and egress pipeline queues of the traffic manager stage, and wherein the match-action stage message processing circuitry is to generate a report for transmission to a second network element, wherein the report is to indicate congestion experienced by the particular data message, and wherein the report comprises a duplicate of a portion of the particular data message and includes information regarding the detected congestion;
wherein:
the queue in which the particular data message is stored is comprised in the prioritized ingress and egress pipeline queues of the traffic manager stage.

2. The network element of claim 1, wherein the second network element comprises a data collector.

3. The network element of claim 1, wherein the match-action stage message processing circuitry is to generate a report is to include an original destination of the particular data message and replace a destination address in the duplicate of a portion of the particular data message with a destination address of the second network element.

4. The network element of claim 1, wherein the match-action stage message processing circuitry is to generate a report is to encapsulate the duplicate of a portion of the particular data message with an outer header that includes a destination address of the second network element.

5. The network element of claim 1, wherein the match-action stage message processing circuitry is to generate a report is to not include at least a portion of a payload of the particular data message in the duplicate of a portion of the particular data message.

6. The network element of claim 1, wherein the information regarding the detected congestion includes one or more of: (1) identifiers that identify a forwarding-element and the congested queue, (2) identifiers that identify the forwarding-element, data-plane, ingress and egress ports through which the particular data message passed, (3) identifiers that identify ingress and egress pipelines that processed the particular data message, or (4) a sequence identifier.

7. The network element of claim 1, wherein to detect that a particular data message experienced congestion while being stored in a queue, the match-action stage message processing circuitry is to determine delay experienced by the particular data message while being stored in the queue.

8. The network element of claim 1, wherein to detect that a particular data message experienced congestion while being stored in a queue, the match-action stage message processing circuitry is to determine whether a depth of the queue is greater than or equal to a threshold queue depth.

9. The network element of claim 1, wherein to generate a report for transmission to a network element regarding the congestion experienced by the particular data message, the match-action stage message processing circuitry is to generate the report based on one or more of: (1) the queue congestion changes from a quantized state to another quantized state; (2) the queue congestion level is above a threshold congestion value; or (3) a quantized state is below the threshold congestion value, but a previously reported queue congestion value was above the threshold congestion value.

10. The network element of claim 1, wherein the network element comprises one or more of: a switch, a router, or a bridge.

11. A method comprising:
at a data plane system of a forwarding-element:
based on detecting that a queue in a traffic manager stage of the forwarding-element is congested while processing a data message, using match-action stage message processing circuitry of an egress pipeline of the data plane system for:
storing a duplicate of a portion of the processed data message,
generating information regarding the detected queue congestion, and
generating a report for transmission to a network device external to the forwarding-element, the report comprising the duplicate of a portion of the processed data message and the information regarding the detected queue congestion;

wherein:
the traffic manager stage is for use in transmitting message data between prioritized ingress and egress pipeline queues of the traffic manager stage; and
the congested queue of the traffic manager stage is comprised in the ingress and egress pipeline queues of the traffic manager stage.

12. The method of claim 11, wherein the network device comprises a data collector.

13. The method of claim 11, wherein the generating a report for transmission to a network device external to the forwarding-element comprises replacing a destination address in the duplicate of a portion of the processed data message with a destination address of the network device.

14. The method of claim 11, wherein the generating a report for transmission to a network device external to the forwarding-element comprises including an original destination of the processed data message and encapsulating the duplicate of a portion of the processed data message with an outer header that includes a destination address of the network device.

15. The method of claim 11, wherein the generating a report for transmission to a network device external to the forwarding-element comprises not including at least a portion of a payload of the processed data message in the report.

16. The method of claim 11, wherein the information regarding the detected congestion includes one or more of: (1) identifiers that identify the forwarding-element and the congested queue, (2) identifiers that identify the forwarding-element, data-plane, ingress and egress ports through which the particular data message passed, (3) identifiers that identify ingress and egress pipelines that processed the particular data message, or (4) a sequence identifier.

17. The method of claim 11, wherein detecting that a queue of a traffic manager stage is congested comprises determining delay experienced by the processed data message while being stored in the congested queue.

18. The method of claim 11, wherein detecting that a queue of a traffic manager stage is congested comprises determining whether a depth of the congested queue is filled greater than or equal to a threshold queue depth.

19. The method of claim 11, wherein the report indicates that one or more of the following has occurred: (1) queue congestion changes from a quantized state to another quantized state; (2) queue congestion level is above a threshold congestion value; or (3) a quantized state is below the threshold congestion value, but a previously reported queue congestion value was above the threshold congestion value.

20. The method of claim 11, comprising:
transmitting the report to the network device.

* * * * *